Patented Nov. 17, 1936

2,061,246

UNITED STATES PATENT OFFICE 2,061,246

GRANULAR MATERIAL

Ernest H. Nichols, Hagerstown, Md.

No Drawing. Application June 12, 1935,
Serial No. 26,316

10 Claims. (Cl. 91—70)

This invention relates to granular material such as is principally used as a surfacing for asphalt-impregnated and/or asphalt-coated shingles and other forms of asphalt roofing, and also used for weather-proofing sides of buildings, and to a process for producing such granular material. This granular material has come to be known as "Roofing Granules" and the present invention relates particularly to roofing granules which are formed of stone, slate, shale, or other mineral matter, crushed and screened to obtain particles of the proper size and then given a suitable coating, glossy or otherwise, in order to render them non-porous and weather-resisting. When it is desired to take advantage of the natural color of the crushed material, the coating may be substantially transparent but when other colors are desired suitable coloring matter is added to the coating, which coating may be transparent, translucent, or opaque, and with a glossy or mat finish.

The present invention is an improvement on that described in my Patent No. 1,970,471, issued on the 14th day of August, 1934, which relates to roofing granules having a surface coating including a partially fused porcelain enamel frit. The present invention relates to roofing granules of the same type, which will be free from certain objections.

It has long been known that the surfaces of roofing granules, upon exposure to the weather often have a tendency to become at least partly coated with a whitish deposit, the formation of this coating being known to the roofing trade as efflorescence or "blooming." Much of the mineral matter used as the base material in the manufacture of roofing granules contains a greater or less percentage of water-soluble salts, particularly alkali compounds, and this is also true of the porcelain enamel frit used in forming the coating. Absorption and evaporation of moisture may draw these compounds to the surface of the granules. Upon exposure of the granules to the air a part of the water present (including water of crystallization) is lost, which causes an efflorescence resulting in the objectional condition mentioned.

This condition is greatly increased in the finished granules carrying the coating of porcelain enamel frit, since these contain an additional amount of the substances which cause the same, namely compounds of the alkali and alkaline earth metals.

The salts which produce the efflorescence are chiefly compounds including sulphates, carbonates, and borates, and other alkaline compounds of the alkali metals and alkaline earth metals. It is known that the efflorescence mentioned has an appearance resembling the efflorescence which occurs on certain clay products, such as brick, terra cotta and the like, which contain water-soluble salts, chiefly sulphates of lime and magnesia, and in some cases, carbonates of lime and magnesia, and that this type of efflorescence may be corrected by the proper use of barium compounds. It is found, however, that the use of barium compounds for the correction of efflorescence on roofing granules of the present type is not satisfactory.

For the prevention of this efflorescence on these granules, I propose to use sodium silicofluoride or any other suitable similar neutralizing agent. Other examples of suitable agents for use in the present invention are the silico-fluorides of potassium, zinc, magnesium and aluminum, and the fluorides of these metals or of chromium.

The sodium silicofluoride mentioned, when applied in the proper formulas, tends to combine with alkali salts or alkaline earth salts and to bind them in new combinations which will not effloresce on exposure under service conditions to air and moisture, and will not effloresce on evaporation of water contained in the granules. In addition to this effect, sodium silicofluoride has certain fluxing properties which tend to improve the final product. The other compounds act in an analogous manner.

An illustrative example of a manner in which roofing granules may be produced with the use of sodium silicofluoride to prevent the efflorescence described will now be set forth, this being given by way of illustration only.

I find that shale lends itself to the production of roofing granules in a very suitable manner, although other minerals may be used.

When using shale, I take the ordinary raw material as it comes from the ground (such as that found in Watsontown Valley, Pennsylvania) and run it through a suitable crusher, the crushed material then being screened to obtain particles of the proper size or sizes, such particles to be hereinafter referred to as "granule stock."

After the granule stock has been produced, this being for example, of a size that will pass a No. 8 mesh screen and be retained on a No. 35 mesh screen, (although other sizes may also be used), it is placed in a suitable batch mixer containing a mixture of water, a finely ground porcelain enamel frit, a color producing metallic salt or oxide or other color compound, according to the color desired, a water soluble priming flux such as borax, a suitable quantity of sodium silicofluoride, these (except the granule stock) having been previously thoroughly ground and mixed together, e. g., in a pebble mill. The amount of water used in the mixture will be such as will produce a proper degree of fluidity of the materials except the granule stock. When charging the mixer, very suitable proportions are, five gallons of the mixture just described to one ton of granules. It will be understood that, when preparing this mixture, in the pebble mill, equal parts of the frit, borax, and sodium silicofluoride may be used, the amount and character of coloring matter used being governed by the result desired. The frit, borax, silicofluoride and water form a slip which can coat the granule stock. If desired, a suitable amount of clay may be added to the foregoing for the purpose of properly suspending the mixture.

The mixer is then operated to cause the granule stock to become saturated, due to its porosity, with a quantity of water, which carries with it dissolved or partly dissolved flux, and sodium silicofluoride, but not the insoluble frit, this latter being left on the surface of the granules excepting for a small quantity which may, perhaps, enter such pores as are sufficiently large to receive it. The coloring agent, if a soluble salt, may also dissolve in the water, and perhaps be precipitated by the alkalies present, or if an oxide, carbonate, or basic salt, it would become suspended with the frit in the water, and with the frit would largely adhere to the surface of the granules. The stock is thus impregnated with flux, sodium silicofluoride, and coloring, and acquires a surface coating on the same, including the frit.

The excess of the fluid mixture is then drawn from the mixer, after which the stock passes into a rotary kiln in which there are three zones of heat, the first, which begins at the entrance and extends substantially one-third the length of the kiln, having a temperature of approximately 1000° F. to 1100° F. Here the flux becomes fused, perhaps together with the more easily fusible silicates contained in the shale, with which the flux has come in contact, so that each granule contains a quantity of this fused material, which fills its pores, and has a coating thereof on its surface, this surface coating then serving to bind the exterior layer of the then unfused enamel frit and coloring, and to hold the same upon the granule stock until the latter reaches the second heat zone. This zone occupies the central longitudinal third of the kiln and the temperature therein is approximately 1400° F. to 1500° F., which temperature is only sufficiently high to partly fuse the frit as the charge passes through the kiln, the usual temperature employed for fusing this frit completely, in the production of porcelain, being approximately 2000° F. The flux, as will be understood, will cause the frit to be interfused at a lower temperature than otherwise.

Owing to the fact that the granule stock will not, at any time, be subjected to a temperature sufficiently high to completely melt the frit within the time that said stock is passing through the kiln, the fine particles of which the frit is composed will not entirely combine with the thoroughly melted flux, to form a homogeneous mass, but will tend to remain intact on the surface of the granules, so that the completed granules will have a rough surface somewhat resembling sand paper, though possessing the usual ceramic appearance. While in this condition, the granule stock passed to the third and last heat zone where the temperature is approximately 1200° F. Here the temperature of the granules is lowered somewhat before they pass from the kiln into a rotary cooler, so as to prevent cracking of their surface glaze. From the cooler, which is preferably of the roller type, and provided with a cooling spray of water, the granules pass into a suitable place of storage.

It will be understood that the temperatures used in the kiln are to be governed by the nature of the flux and frit employed, some requiring a higher temperature than given, while others may require a lower temperature. It will be understood, however, that the temperature of the first zone will be such as will cause a complete fusing of the silicofluoride and borax, and that the temperature of the second zone will be such as will cause only a partial fusing of the frit, the temperature of the third zone being somewhat less than that of the second, to prevent a too sudden cooling of the granules.

The process may be carried out by adding sodium silicofluoride and a flux to any suitable porcelain frit, for example to that described in U. S. Patent No. 1,988,800, which frit as stated therein may show the following analysis:

| | Percent |
|---|---|
| Sodium oxide ($Na_2O$) | 17 |
| Calcium fluoride ($CaF_2$) | 5 |
| Sodium aluminum fluoride ($Na_2AlF_6$) | 1 |
| Antimony oxide ($Sb_2O_5$) | 7 |
| Boric anhydride ($B_2O_3$) | 11 |
| Silica ($SiO_2$) | 41 |
| Titanium oxide ($TiO_2$) | 14 |
| Zirconium oxide ($ZrO_2$) | 4 |
| Total | 100 |

However, the invention is not limited to the use of this, and various other porcelain frits can be used.

It will be understood that the ratio of water to the mixture of frit, borax flux and silicofluoride can vary between wide limits. In a particular case, with five gallons of water, I have used fifty-four pounds of such mixture. In other cases, with five gallons of water, I have used thirty-three to ninety pounds of such mixture.

I have referred also to using, in a preferred formula, equal parts of frit, borax flux and silicofluoride. But the proportions of these also can vary between wide limits.

It is understood that borax is here cited merely as a typical example of an alkaline flux, and that numerous others could be substituted.

If desired, colors can be imparted to the semifused porcelain frit by the addition of the oxides or salts of iron, chromium, cobalt, etc., or a mixture of these, in small amounts.

What I claim is:

1. A process of surfacing roofing granules of stony material, which comprises agitating a bulk of such stony fragments with a much smaller bulk of water containing a finely ground porcelain frit, an alkaline flux and fusible fluorine compound selected from the group consisting of the silico-fluorides and fluorides of sodium, potassium, zinc, magnesium and aluminum, and chromium fluoride, until the stony fragments are somewhat coated with said frit, and thereafter heating the so coated stony fragments sufficiently to partly fuse said frit and cause adhesion thereof to said stony fragments.

2. Process as in claim 1, in which a mineral coloring agent is also present with said frit, to produce a colored coating.

3. A method of making granular material consisting of forming granules of a desired size from porous mineral material, impregnating the same with a priming flux, applying a surfacing of said flux and a porcelain enamel frit, and a fusible fluorine compound selected from the group consisting of the silico-fluorides and fluorides of sodium, potassium, zinc, magnesium and aluminum, and chromium fluoride, and firing the same at a temperature and for a time to completely fuse the flux and to partly fuse the frit.

4. A method of making granular material consisting of forming granules of a desired size from mineral material, applying a surfacing of flux and a porcelain enamel frit, and a fusible fluorine compound selected from the group consisting of the silico-fluorides and fluorides of sodium, potassium, zinc, magnesium and aluminum, and chromium fluoride, and firing the same at a temperature and for a time to completely fuse the flux and partly fuse the frit.

5. A method of making granular material consisting of forming granules of a desired size from porous mineral material, impregnating the same with a priming flux having a relatively low melting point, applying a surfacing of said flux and a porcelain enamel frit having a relatively high melting point and a fusible fluorine compound selected from the group consisting of the silico-fluorides and fluorides of sodium, potassium, zinc, magnesium and aluminum, and chromium fluoride, firing the granules at a temperature sufficient to cause combination of the flux and porous material but below that sufficient to melt the frit, and thereinafter continuing the firing at a temperature and for a time sufficient to partly fuse the frit.

6. A method of making granular material consisting of forming granules of a desired size and from porous mineral material, impregnating the same with a water soluble priming flux having a relatively low melting point, and a fusible fluorine compound selected from the group consisting of the silico-fluorides and fluorides of sodium, potassium, zinc, magnesium and aluminum, and chromium fluoride, applying a surfacing of said flux and a porcelain enamel frit having a relatively high melting point, firing the granules at a temperature sufficient to cause combination of the flux and porous material but below that sufficient to melt the frit, and thereinafter continuing the firing at a temperature sufficient to partly fuse the frit.

7. Roofing granules as described, containing the reaction products of a basic flux, a fusible fluorine compound selected from the group consisting of the silico-fluorides and fluorides of sodium, potassium, zinc, magnesium, and aluminum, and chromium fluoride, and a porcelain frit, such granules being substantially free from tendency to effloresce, due to changes in the moisture content of the ambient atmosphere, and the porcelain frit being partly fused upon the surfaces of said granules.

8. Roofing granules as described, containing the reaction products of a basic flux, sodium silicofluoride and a porcelain frit, such granules being substantially free from tendency to effloresce, due to changes in the moisture content of the ambient atmosphere, and the porcelain frit being partly fused upon the surfaces of said granules.

9. A roofing material comprising a base the surface of which is mineralized with granules as set forth in claim 7.

10. A roofing material comprising a base the surface of which is mineralized with granules as set forth in claim 8.

ERNEST H. NICHOLS.